Aug. 31, 1937.

A. E. WARREN 2,091,841

SYNCHRONIZED CLOCK

Filed Sept. 15, 1936

Inventor:
Henry E. Warren,
by Harry E. Dunham
His Attorney.

Patented Aug. 31, 1937

2,091,841

UNITED STATES PATENT OFFICE 2,091,841

SYNCHRONIZED CLOCK

Henry E. Warren, Ashland, Mass., assignor to Warren Telechron Company, a corporation of Maine Application September 15, 1936, Serial No. 100,877

4 Claims. (Cl. 58—26)

My invention relates to spring-driven or weight driven escapement clocks of the type which are synchronized with the frequency of an alternating-current system while such system is energized and which continue to run during periods of failure of the alternating-current system.

The purpose of my invention is to provide an inexpensive yet reliable and effective synchronizing arrangement which is free from mechanical interference with the escapement and from noise incident to such mechanical interference. Another object of my invention is to provide a synchronizing device which will start the clock into operation from a condition of rest.

In carrying my invention into effect, I provide a synchronous motor which rotates a permanent magnet assembly in the vicinity of the pendulum or escapement of the clock to be synchronized. The pendulum or escapement of the clock is also provided with a permanent magnet which oscillates therewith. I make use of the magnetic forces which thus exist between two sets of permanent magnets to bias the clock mechanism to oscillate in synchronism with the synchronous motor driven magnet system. I have found this method to be very effective. It requires no mechanical connection or interference between the different parts and does not impair the action of the clock when the synchronous motor stops.

The features of my invention which are believed to be novel and patentable will be pointed out in the claims appended hereto. For a better understanding of my invention, reference is made in the following description to the accompanying drawing which illustrates in Fig. 1 my invention applied to a pendulum clock and in Fig. 4 to a balance wheel type of escapement. Figs. 2 and 3 represent different possible operating positions of the synchronizing device of Fig. 1. Fig. 5 shows a single rotary bar magnet for synchronizing a pendulum provided with a magnet.

Figure 1:
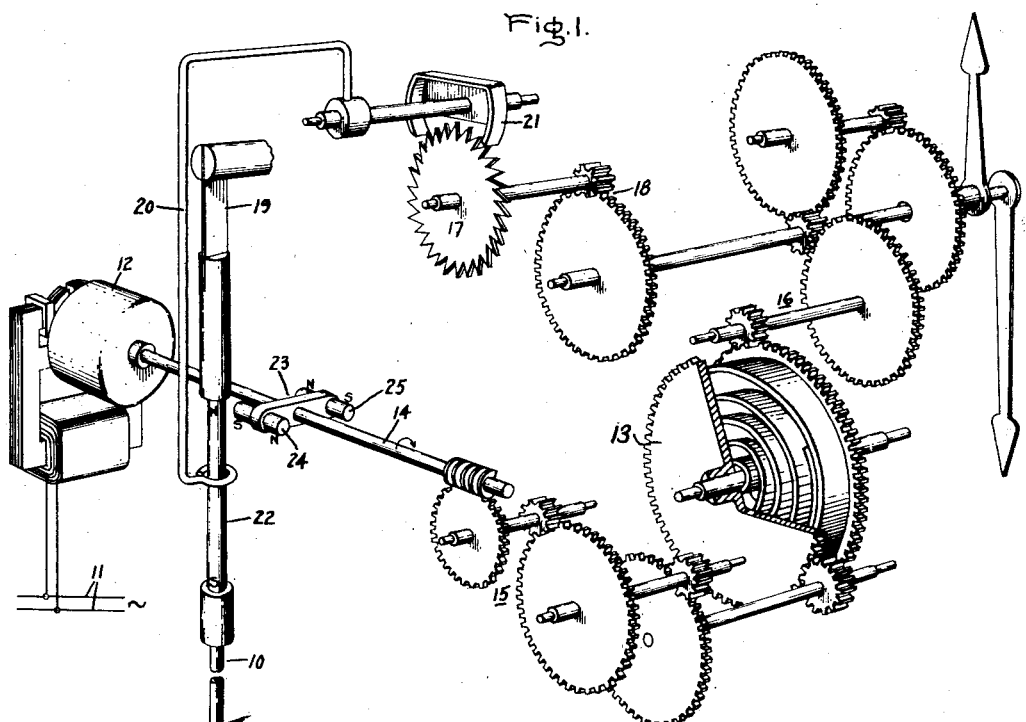
Figures 2, 3:
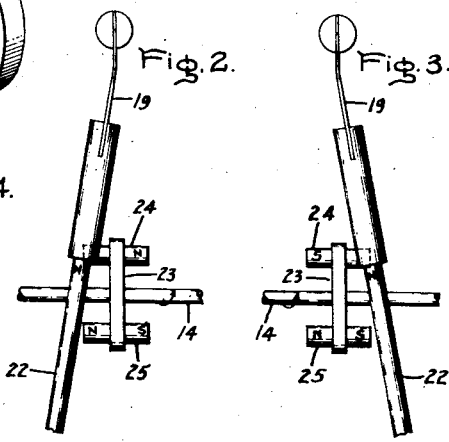

Referring now to Fig. 1, I have shown here a usual form of spring-driven pendulum clock to which my invention has been applied for maintaining the pendulum 10 in synchronism with the frequency of an alternating-current power system 11 when power is available. A synchronous motor 12 is provided, energized from the power system, and is used to wind the clock spring contained in the spring barrel 13. The drive between the sychronous motor and spring barrel is through a shaft 14 and suitable speed-reducing gears 15. The spring barrel is of a type in which the spring slips when fully wound up and permits the synchronous motor to continue operating at synchronous speed. Ordinarily, the spring is wound by the synchronous motor slightly faster than it is unwound in driving the clock. The spring drives a clock train and clock hands through gearing represented at 16 and is connected to an escapement wheel 17 through gears 18. The pendulum is suspended at its upper end by a spring 19 and is provided with a rod 20 for oscillating the escapement pallet 21 in accordance with the oscillation of the pendulum.

My invention is applied to this common form of clock in a very simple way, as follows:

Mounted on or made a part of the pendulum rod is a permanent magnet bar 22 which, therefore, necessarily oscillates with the pendulum. Near the pendulum, when in the center of its swing, is mounted a permanent magnet assembly 23, which is rotated on a horizontal axis by the synchronous motor 12. For this purpose, the assembly 23 may be mounted on the shaft 14 between the motor and the spring-winding gearing. The assembly 23 includes in this case a pair of small bar permanent magnets 24 and 25, parallel and equally distant from shaft 14 on opposite sides thereof. The two magnets 24 and 25 are assembled with adjacent ends of opposite polarity, as indicated by the designations N and S. The magnets 24 and 25 will be rotated by the synchronous motor in a vertical plane at right angles to the vertical plane in which the pendulum oscillates, the rotary magnets are centered with respect to the pendulum when in the center of its oscillation, and are near the upper end of the permanent magnet 22 which forms a part of the pendulum rod. The distance between the centers of shaft 14 and pendulum rod 22 may be about one inch and between the centers of shaft 14 and bar magnets 24 and 25 about one-half of an inch with the other dimensional relations in the proportions shown although it is not essential that these relations be strictly adhered to for successful operation.

When the frequency of system 11 is correct and the rate of the pendulum is correct, shaft 14 should make one complete revolution while the pendulum makes one complete oscillation. When the pendulum and motor are set into operation, the arrangement will force the pendulum to operate in synchronism even though it would otherwise depart from its correct time-keeping rate as much as to cause a clock error of several minutes a day. I have found that there is no difficulty at all in correcting an error of plus or minus eight minutes per day in the rate of the clock by this simple synchronizing scheme, and this is far greater than necessary for this kind of clock.

The synchronizing forces, which act between the pendulum and rotating magnets, may be visualized by referring to Figs. 2 and 3. In Fig. 2, it is assumed that pendulum magnet 22 has started swinging to the right and that the shaft 14 rotates so as to cause magnet 25 to approach the pendulum. By the time magnet 25 has made one-fourth of a revolution and pendulum magnet 22 has swung to the mid-position, the north poles of magnets 22 and 25 will repel and the south pole of magnet 25 will attract the pendulum magnet, thereby producing an accelerating impulse. If, however, the condition is as represented in Fig. 3, magnet 25 being in the same position but the pendulum being advanced in position by a half oscillation and starting to swing to the left, there will be a retarding impulse on the pendulum as the magnet 25 approaches the pendulum. There will be a condition between those represented in Figs. 2 and 3 where the forces tending to retard and accelerate the pendulum will be balanced each time a magnet 24 or 25 approaches closest to the pendulum, and this is approximately the condition in which the pendulum will be forced to oscillate. As the pendulum reverses from one side to the other of its midposition, the two magnets 24 and 25 will reverse positions in phase therewith and they will thus have similar effects on the pendulum so long as the phase relation remains the same. It is immaterial which way the shaft 14 rotates.

If now the power of system 11 should fail and the motor 12 stops, magnets 24 and 25 may stop in any position. The clock, however, keeps on running until the spring in barrel 13 runs down. The pendulum will now oscillate at its regular rate because, although there may be magnetic forces on it as it swings past a stationary magnet, the repelling forces are equal to the accelerating forces although applied at slightly different parts of the swing. The magnets 24 and 25, therefore, do not prevent normal operation of the pendulum should they stop rotating in any position.

It is evident that this arrangement avoids any mechanical connection or mechanical interference between the pendulum and synchronizing magnets. Noise, shock, and wear in the synchronizing device are absent. The cost of the extra permanent magnets is very small as compared to many devices for the same purpose and the synchronizing action is very effective.

Figure 4:
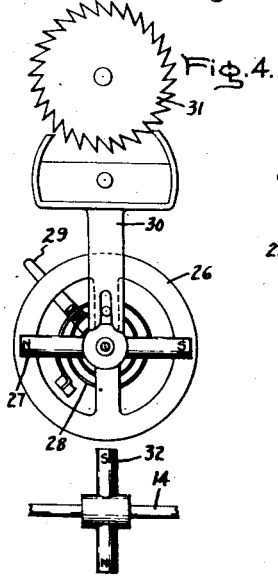
Figure 5:
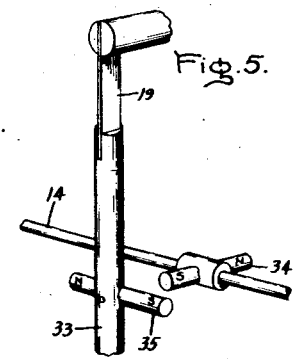

In Fig. 4, the invention is shown in modified form applied for maintaining a balance wheel type of escapement in synchronism. Here 26 represents the balance wheel, which has a small bar magnet 27 secured thereto or to its shaft so that the two will oscillate together. 28 represents the usual hairspring and 29 a regulator therefor. The verge is shown at 30, and the escape wheel at 31. The remainder of the clock mechanism has been omitted but may be generally similar to that shown in Fig. 1. A shaft 14 driven by the synchronous motor, not shown, is so mounted as to pass the vicinity of the balance wheel at right angles to its axis of rotation.

The shaft 14 has a small bar magnet 32 fixed thereto with its pole pieces extending in opposite directions from the shaft in the plane of the axis of rotation of the balance wheel such that, when the shaft 14 rotates, the north and south poles of the magnet 32 describe a circle and are alternately brought near to the extremity of the arc of swing of the ends of the permanent magnet 27 on the balance wheel. In this case, both ends of the permanent magnet on the balance wheel are alternately used so that only one synchronous-motor-driven magnet 32 is necessary. When the rates of the synchronous motor and balance wheel are correct, shaft 14 should make one revolution as the balance wheel makes one complete oscillation. The balance wheel is shown in the center of its swing and is assumed to oscillate through a range of about ninety degrees in either direction from the position shown so as to alternately bring opposite poles of the magnet 27 near to the permanent magnet 32.

It will be evident that, with the device in operation, the balance wheel will tend to synchronize at a rate and in a reoccuring phase position where unlike poles of the two magnets 27 and 32 approach each other each half oscillation. If the balance wheel then tends to oscillate at a different rate, this phase position of the two magnets will tend to shift and set up magnetic forces of attraction between unlike poles and of repulsion between like poles of the two magnets, which oppose such change in relative rates. Should the synchronous motor stop in any position, any influence of the magnet 32 on the balance wheel magnet will be equalized between accelerating and decelerating effects, which will allow the balance wheel to continue in operation at its natural rate. The balance wheel spring 26 should be so adjusted as to make the rate as near accurate as possible when the magnet 32 is stationary.

In both of the synchronizing devices illustrated in Figs. 1 and 4, the parts which are closely associated with the permanent magnets should preferably be made of some nonmagnetic material. For example, in Fig. 1, the shaft 14, the holder 23, and that portion of the pendulum rod directly above the permanent magnet 22 should preferably be of non-magnetic material.

Fig. 5 represents another modification of my invention as applied to a pendulum clock where one bar magnet is employed on the pendulum and one on the rotating shaft. In this case the pendulum rod 33 carries a small bar magnet 35 at right angles thereto, the magnet being centered on the pendulum rod and extending in the plane in which the pendulum swings. The shaft 14 rotated by the synchronous motor carries a single bar magnet 34 extending equally in opposite directions at right angles to the shaft, and positioned with respect to the pendulum so that the ends of the magnet 34 will describe a circle in a vertical plane through the mid-position of the pendulum such that as the pendulum swings and the shaft 14 rotates the opposite ends of the two permanent magnets will alternately be brought close together and the pendulum will synchronize at a rate and phase position where poles of opposite polarity in the two magnets will approach each other in synchronous relation. In any of the modifications described the permanent magnets may be made strong enough to start the pendulum or other escapement mechanism from rest. For example, in Fig. 1, let us assume that the clock and synchronous motor are at rest and that the clock spring has run down. Now assume that the synchronous motor is started. When magnet 24 is closest to the pendulum there will be magnetic forces tending to move the pendulum to the left. When the magnet 25 is closest to the pendulum there will be magnetic forces tending to move the pendulum to the right. These forces occur at a rate close to the natural rate of oscillation of the pendulum and hence they will gradually set the pendulum swinging through a greater and greater amplitude until finally the swing becomes sufficient to operate the escapement. By this time the spring has become wound up to a certain extent and the clock begins to function in a normal manner. It will probably need setting to correct time but the synchronizing device described can readily be made to start the clock into operation.

In the case of the balance wheel escapement of Fig. 4 the mass to be set into oscillation is smaller than in the case of the pendulum and the starting process will be somewhat quicker. For most current interruptions of the alternating current source the clock spring will maintain the clock in operation until the power is resumed. However, in case the spring runs down and the clock stops, it may be started again by the synchronizing device described. This functioning of the apparatus is possible because when the synchronous motor is in operation, the forces produced by the permanent magnet assembly driven thereby are accumulative on and synchronous with the natural rate of oscillation of the associated escapement device, but when the synchronous motor stops the magnetic forces if any acting on the escapement cancel out and do not prevent normal clock operation.

What I claim is new and desire to secure by Letters Patent of the United States is:

1. A spring-driven clock having an escapement for controlling said clock and a pendulum for timing the rate of oscillation of said escapement adjusted to normally cause the clock to operate at approximately a correct rate, means for synchronizing the rate of oscillation of said escapement with the frequency of an alternating-current source comprising, a synchronous motor to be connected to such source, a horizontal shaft parallel to the plane of oscillation of said pendulum driven by said motor at a rate of one revolution for each complete oscillation of said pendulum when the rate of the latter is correct, a pair of permanent bar magnets secured to and parallel to said shaft on opposite sides thereof with their magnetic poles of different polarity opposite each other, said bar magnets extending equally on either side of the center of oscillation of said pendulum opposite a point therein where its range of oscillation corresponds to approximately the length of said magnets, and a permanent magnet carried by said pendulum with one of its pole pieces opposite said shaft and spaced from said shaft so that the shaft with its permanent magnets may rotate without touching the pendulum and its magnet but close enough to cause the rotating magnets to produce accelerating or retarding effects on said pendulum as said magnets approach nearest the pendulum when the pendulum tends to oscillate too slow or too fast, respectively.

2. In a clock, a pivoted oscillating member, the rate of oscillation of which determines the rate of the clock, a permanent bar magnet pivoted at its center to oscillate with said member, said parts having an oscillating range of approximately 180 degrees, a second permanent bar magnet pivoted for rotation at its center and so positioned that, when rotated, its opposite ends alternately approach and recede from a point close to the position occupied by the opposite ends of the oscillating bar magnet at the extremities of its oscillation but without mechanical interference therewith, and means for rotating the second mentioned magnet at a substantially constant speed one revolution for each complete oscillation of the first mentioned magnet when the rate of its oscillation is correct.

3. In a clock, an escapement device having a natural rate of oscillation which is substantially the same as that required for the correct time-keeping rate of the clock, means for starting said escapement device into operation from rest comprising, a permanent magnet oscillated with the escapement, a synchronous motor, and permanent magnet means rotated by the synchronous motor at a rate which is synchronous with the correct time-keeping rate of oscillation of the escapement, the synchronous-motor-rotated permanent-magnet means being located close to but out of mechanical contact with the permanent magnet oscillated with the escapement device and having a cycle of movement when rotating such as will produce accumulative magnetic forces on the escapement device magnet tending to set it and the escapement device into oscillation, the permanent magnet oscillated by the escapement having a cycle of movement when oscillating such as will cause the magnetic forces acting thereon to cancel should the rotary permanent magnet means stop in any rotative position.

4. A clock, a spring for driving said clock, an oscillatory escapement device for controlling the rate of said clock, a self-starting synchronous motor, and a pair of permanent magnet means, one secured to oscillate with said escapement device and the other rotated by said motor for maintaining the oscillating rate of said escapement correct when said parts are in operation and for starting said escapement to oscillating from a condition of rest when the synchronous motor is in operation due to repulsion and attraction magnetic effects between said pair of permanent magnetic means, said permanent magnet means rotated by the synchronous motor having its axis of rotation perpendicular to the axis of oscillation of the escapement and having a path of rotation symmetrical with respect to the center point of oscillation of the escapement whereby, when the permanent magnet means rotated by the synchronous motor is stationary in any rotative position, the correct time-keeping rate of the escapement is not interfered with thereby.

HENRY E. WARREN.